March 15, 1927. 1,621,070

C. J. HOLSLAG

ELECTRIC ARC WELDING AND CUTTING SYSTEM

Original Filed Feb. 9, 1923

INVENTOR
CLAUDE J. HOLSLAG
BY
A. D. J. Libby
ATTORNEY

Patented Mar. 15, 1927.

1,621,070

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRIC-ARC WELDING AND CUTTING SYSTEM.

Original application filed February 9, 1923, Serial No. 617,919. Divided and this application filed October 25, 1924. Serial No. 745,732.

This invention relates to electric arc welding and cutting, and is a division of my prior application, Serial No. 617,919 filed February 9, 1923. In said previous application it has been pointed out that for certain classes of work there is a demand for a resistor-reactor welding system which generally consists of a suitable resistance, reactance, and the necessary apparatus to connect these together into a welding system. My present invention is directed to a system for supplying this special demand.

In said previous application, I pointed out the advantages of a reactor having a core which is automatically moved to give the necessary results and it is one of the objects of my present invention to enlarge on this particular feature by pointing out and claiming more in detail the use of a relay-reactor, which performs a double function of a relay and a reactor, as the name implies.

Another object of my invention is to provide means for controlling a relatively high voltage of a direct current supply, so that the voltage normally across the arc electrodes, when they are not in use, is reduced to a safe value, whereby operators will not receive injurious shocks; and furthermore automatically control the current so the arc circuit is opened should the arc length be extended by the operator to a point where improper or poor welding is being done.

Where only one operator is used across the supply leads from a source of direct current of a voltage considerably above the welding voltage, the loss in regulating resistances becomes of great importance and it is, therefore, another object of my invention to provide a system in which these regulating losses are reduced to a minimum. This object is attained by an arrangement such that a plurality of arcs may be operated across the source of supply, thereby increasing the efficiency of the system in direct ratio to the number of operators served from a given voltage supply. In attaining the above stated object, I control the arc voltage so that no long arc can be held with disastrous results. I also control the arc by shunting the same instead of opening the welding circuit, thereby not interfering with the other operators.

Other objects will be apparent to one skilled in this art after a study of the specification and drawing wherein:

Figure 3 is a slightly modified form of the operator's set shown in Fig. 2; while

Figure 1:
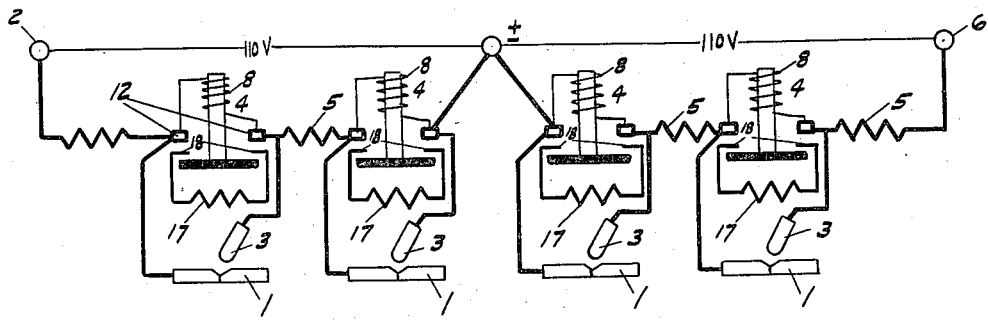
Figure 1 shows four operators' sets connected across a three-wire source of supply.

In the drawing the relay 4 has the terminals of its winding 8 connected to the contacts 12 to which contacts are also connected the arc electrodes 1 and 3, as well as the terminals of the stabilizing resistance 5, thereby normally connecting the stabilizing resistance 5 and the winding 8 all in series across the source of supply. The compensating resistance 17 is connected to a pair of contacts 18. The contacts 18 are normally standing open as shown, but are adapted to be connected to the contacts 12 when the relay 4 is operated by the winding 8. The compensating resistance 17 is relatively low as compared with the winding 8 and when the contacts 18 are in engagement with the contacts 12 the drop across the resistance 17 is intended to be substantially the same as the normal voltage across the arc which is enough to hold the relay in operated position but not enough to actuate it from open position. In operation, when the power circuit has been closed to the terminals 2 and 6 and the electrodes are not in use, the relay windings 8 actuate the relay to close a circuit through the compensating resistance 17 as above described. Now when one of the operators touches the electrode 3 to the work 1, this produces a short circuit around the winding 8, as well as the compensating resistance 17 and the relay 4 immediately opens to the position shown in Fig. 1 and the arc is then struck and the work proceeded with, current flowing through the stabilizing resistance 5 and the arcs being in series, it being understood that a plurality of operators are at work. Should for any reason one of the operators draw too long an arc, the voltage across the electrodes, and consequently at the terminals 12 will increase and more current will flow through the winding 8, causing the relay 4 to be actuated and bringing in the compensating resistance 17 so that no disturbance will be produced among the other operators as has been described.

From the arrangement shown in Fig. 1, it is seen that there are no buttons, switches or extra wires and that there is no high voltage across the electrodes on account of the series arrangement, which furthermore reduces the losses in a system of this character to a minimum.

Figure 2:
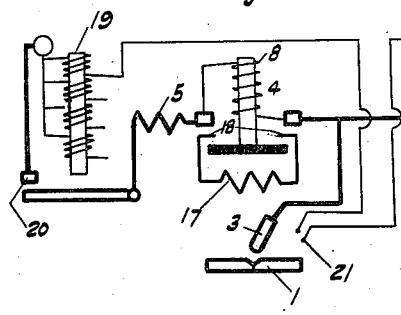
Figure 2 is a modified arrangement of one of the operator's or arc positions shown in Fig. 1.

In Fig. 2, I have shown an individual operator's welding set and it is to be understood that a plurality of sets may be connected as in Fig. 1. The arrangement of Fig. 2 is such that when the last operator working is through, the main circuit is opened by means of a relay 19 controlling the contact 20. The relay 19 is provided with a winding, one for each operator and each of these windings is controlled by a pair of contacts 21 normally held closed by the operator in holding the electrode holder.

Figure 3:
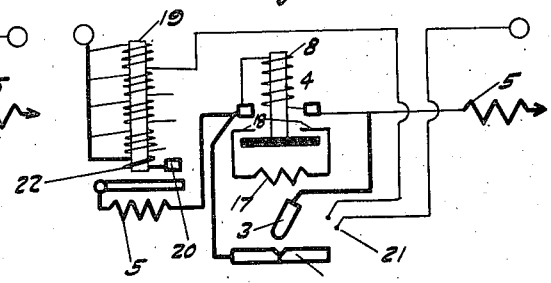
Figure 4:
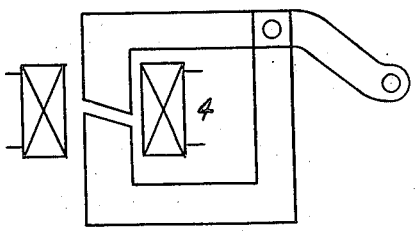
Figure 4 is a diagrammatic view of the reactor-relay shown in Figs. 1, 2, and 3, but with all the levers, springs, contacts, etc., removed for the sake of clarity.

The arrangement in Fig. 3 is very similar to that shown in Fig. 2, but the relay 19 has a series winding 22 thereon and the button 21 does not need to be held closed by the operator all the time he is welding but it may be just closed temporarily while he is starting the arc.

It will be readily appreciated that since the arrangements shown in the drawing are schematic that the principles of my welding systems may be carried out by the use of numerous designs, so far as the particular pieces of apparatus are concerned, and I, therefore, do not wish to be limited to any particular design of a relay, or compensating or stabilizing resistance as these designs may be varied through a wide range.

It may be pointed out that a winding 8 of the relay 4 in Figs. 1 to 3 inclusive acts as an aid in absorbing the inductive kick when the arc is broken.

Having thus described my invention what I claim is:

1. In an arc welding and cutting system, a source of D. C. current of relatively high voltage, means for operating a plurality of arcs across said source consisting of; a relay, a steadying resistance and a compensating resistance for each pair of arc electrodes; said relay having main contacts to which its winding is connected and auxiliary contacts to which said compensating resistance is connected, said arc electrodes being connected to said main contacts, said relay being normally in position to hold the compensating resistance to open circuit but adapted to connect the same in series with said main contacts when the arc is broken or when the voltage there across reaches a predetermined high value, said steadying resistance being connected in series with said main contacts.

2. In an arc welding and cutting system, a source of D. C. current of relatively high voltage, means for operating a plurality of arcs across said source consisting of; a relay, a steadying resistance in series with the relay and a compensating resistance for each pair of arc electrodes; said relay having contacts which coact on actuation of the relay to introduce said compensating resistance into parallel relationship with said relay winding and into the welding circuit if one of said arcs goes out or becomes too long for good welding.

3. In an arc welding and cutting system, a source of D. C. current of relatively high voltage, means for operating a plurality of arcs across said source consisting of; a relay, a steadying resistance in series with the relay and a compensating resistance for each pair of arc electrodes; said relay having contacts which coact on actuation of the relay to introduce said compensating resistance into the welding circuit if one of said arcs goes out or becomes too long for good welding, said relay also acting to cut out the compensating resistance from the arc circuit when the corresponding set of electrodes are brought together preparatory to starting the arc.

4. In an arc welding and cutting system, a source of D. C. current of relatively high voltage, means for operating a plurality of arcs across said source consisting of; a relay, a steadying resistance and a compensating resistance for each pair of arc electrodes; said relay serving to render each set automatic whereby the other sets in the group can be operated without interference one with the other, a master relay for controlling the application of power to all the sets and means at each set for operating the master relay.

5. In an arc welding and cutting system, a source of D. C. current of relatively high voltage, means for operating a plurality of arcs across said source consisting of; a relay, a steadying resistance and a compensating resistance for each pair of arc electrodes, said relay serving to render each set automatic whereby the other sets in the group can be operated without interference one with the other, a master relay for controlling the application of power to all the sets, and a switch at the movable electrode holder of each set for actuating the master relay.

6. In an arc welding and cutting system, a source of D. C. current of relatively high voltage, means for operating a plurality of arcs across said source consisting of; a relay, a steadying resistance and a compensating resistance for each pair of arc electrodes, said relay serving to render each set automatic whereby the other sets in the group can be operated without interference one with the other, said relay winding serving also as an aid in absorbing the kick voltage produced when the arc is broken.

In testimony whereof, I affix my signature.

CLAUDE J. HOLSLAG.